UNITED STATES PATENT OFFICE.

AUGUST BLANK, CARL HEIDENREICH, AND JOHANNES JANSEN, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

COTTON-DYESTUFFS.

1,082,581. Specification of Letters Patent. Patented Dec. 30, 1913.

No Drawing. Application filed April 29, 1913. Serial No. 764,354.

*To all whom it may concern:*

Be it known that we, AUGUST BLANK, CARL HEIDENREICH, and JOHANNES JANSEN, doctors of philosophy, chemists, citizens of the German Empire, residing at Leverkusen, near Cologne-on-the-Rhine, Germany, have invented new and useful Improvements in Cotton-Dyestuffs, of which the following is a specification.

We have found that new and valuable cotton dyestuffs can be obtained by combining the tetrazo compounds of diaminodiphenylureas:

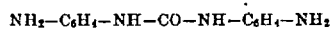

with one molecule of a sulfonic acid which can be further diazotized after copulation, rediazotizing and coupling with two molecules of the same or two different azo dyestuff components, such as resorcin, meta-phenylenediamin, meta-aminophenol, etc. These dyestuffs of the present invention have the following graphically represented constitution:

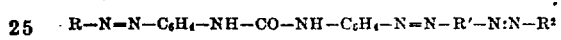

in which R and R² are end components and R′ the radical of an aromatic sulfonic acid.

The new products are after being dried and pulverized in the shape of their alkaline salts dark powders soluble in water generally with a brownish coloration. They dye cotton brown shades. These colors are rendered very fast to washing by aftertreatment with formaldehyde of fibers dyed with them.

In order to illustrate the new process more fully the following example is given, the parts being by weight:—12.1 parts of meta-diaminodiphenylurea are dissolved in 150 parts of hot water and 30 parts of hydrochloric acid, the solution is cooled with ice to 0° C. and is tetrazoized with a solution of 6.9 parts of sodium nitrite. Subsequently to the tetrazo compound a solution of 12 parts of 2-amino-8-naphthol-6-sulfonic acid in 250 parts of water and 25 parts of soda is added. The production of intermediate compound is soon complete. The mass of the reaction is then acidulated with 50 parts of hydrochloric acid and a solution of 3.5 parts of nitrite is added. After a 3–5 hours' stirring, to the tetrazo compound a solution of 18 parts of meta-phenylenediamin hydrochlorid in water is added and the liquid is rendered distinctly alkaline. The azo dye is salted out. It is after being dried and pulverized in the shape of its sodium salt a dark powder soluble in water with a brown coloration and being soluble in concentrated sulfuric acid of 66° Bé. with a brown coloration. It has in a free state most probably the formula:

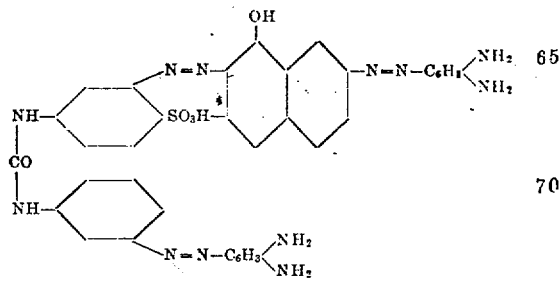

Upon treatment with stannous chlorid and hydrochloric acid the dye is decomposed, carbonic, meta-phenylenediamin, triaminobenzene. 2.7-diamino-8-naphthol-6-sulfonic acid being obtained. It dyes cotton in bright brown shades, which are rendered fast to washing by an aftertreatment with formaldehyde. Dyes of quite similar properties are obtained from para-para-diaminodiphenylurea. Other intermediate compounds can be used, such as 1.6- or 1.7-naphthylamin sulfonic acid (or a mixture thereof), 2.5.7-aminonaphthol sulfonic acid, meta-phenylenediamin sulfonic acid or other end components, such as meta-toluylenediamin, resorcin, aminophenol, etc. Of course two different end components can be used.

We claim:—

1. The herein described new cotton dyestuffs being trisazo-dyestuffs containing a diphenylurea group, which dyes are after being dried and pulverized in the shape of their alkaline salts dark powders soluble in water generally with a brownish coloration and dyeing cotton in brown shades, which are rendered very fast to washing by an aftertreatment with formaldehyde of fibers dyed with them, substantially as described.

2. The hereindescribed new cotton dyestuffs of the following general formula:

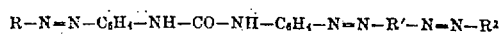

in which R and R² are suitable end components and R' the radical of an aromatic sulfonic acid, which dyes are after being dried and pulverized in the shape of their alkaline salts dark powders soluble in water generally with a brownish coloration and dyeing cotton in brown shades, which are rendered very fast to washing by an after-treatment with formaldehyde of fibers dyed with them, substantially as described.

3. The herein described new cotton dyestuffs of the following general formula:

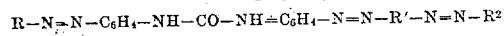

in which R and R² are suitable end components and R' the radical of a naphthalene sulfonic acid, which dyes are after being dried and pulverized in the shape of their alkaline salts dark powders soluble in water generally with brownish coloration and dyeing cotton in brown shades, which are rendered very fast to washing by a treatment with formaldehyde of fibers dyed with them, substantially as described.

4. The hereindescribed new cotton dyestuffs of the following general formula:

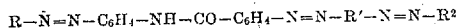

where R and R² are end components containing amino groups and R' the radical of an aromatic sulfonic acid, which dyes are after being dried and pulverized in the shape of their alkaline salts dark powders soluble in water generally with a brownish coloration and dyeing cotton in brown shades, which are rendered very fast to washing by an after treatment with formaldehyde of fibers dyed with them, substantially as described.

5. The herein described new cotton dyestuffs of the following general formula:

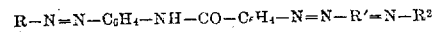

where R and R² are end components containing amino groups and R' the radical of a naphthalene sulfonic acid, which dyes are after being dried and pulverized in the shape of their alkaline salts dark powders soluble in water generally with a brownish coloration and dyeing cotton in brown shades, which are rendered very fast to washing by an after treatment with formaldehyde of fibers dyed with them, substantially as described.

6. The herein described new cotton dyestuff having in a free state most probably the formula:

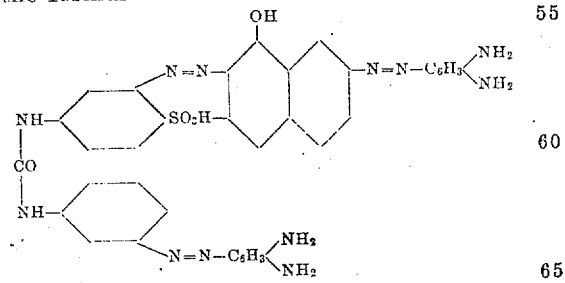

which is after being dried and pulverized in the shape of its sodium salt a dark powder soluble in water with a brown coloration and being soluble in concentrated sulfuric acid of 66° Bé. with a brown coloration; yielding upon reduction with stannous chlorid and hydrochloric acid carbonic acid, metaphenlylenediamin, triamino-benzene and 2.7-diamino-8-naphthol-6-sulfonic acid; and dyeing cotton in bright brown shades, which are rendered fast to washing by an after-treatment with formaldehyde, substantially as described.

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
HELEN NUFER,
ALBERT NUFER.

---

Copies of this patent may be obtained for five cents each, by addressing the "Commissioner of Patents, Washington, D. C."

---

It is hereby certified that in Letters Patent No. 1,082,581, granted December 30, 1913, upon the application of August Blank, Carl Heidenreich, and Johannes Jensen, of Leverkusen, near Cologne, Germany, for an improvement in "Cotton Dyestuffs," errors appear in the printed specification requiring correction as follows: Page 1, line 42, for the word "tetrazoized," read *tetrazotized;* same page, line 77, after the word "carbonic" insert the word *acid;* page 2, line 12, formula, for $$R-N=N-C_6H_4-NH-CO-NH=C_6H_4-N=N-R'-N=N-R^2,$$

read $$R-N=N-C_6H_4-NH-CO-NH-C_6H_4-N=N-R'-N=N-R^2,$$

and that the said Letters Patent should be read with these corrections therein that the same may conform to the record of the case in the Patent Office.

Signed and sealed this 3rd day of March, A. D., 1914.

[SEAL.]

J. T. NEWTON,

*Acting Commissioner of Patents.* nents and R' the radical of an aromatic sulfonic acid, which dyes are after being dried and pulverized in the shape of their alkaline salts dark powders soluble in water generally with a brownish coloration and dyeing cotton in brown shades, which are rendered very fast to washing by an after-treatment with formaldehyde of fibers dyed with them, substantially as described.

3. The herein described new cotton dyestuffs of the following general formula:

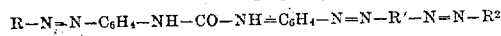

in which R and R² are suitable end components and R' the radical of a naphthalene sulfonic acid, which dyes are after being dried and pulverized in the shape of their alkaline salts dark powders soluble in water generally with brownish coloration and dyeing cotton in brown shades, which are rendered very fast to washing by a treatment with formaldehyde of fibers dyed with them, substantially as described.

4. The hereindescribed new cotton dyestuffs of the following general formula:

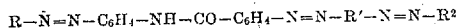

where R and R² are end components containing amino groups and R' the radical of an aromatic sulfonic acid, which dyes are after being dried and pulverized in the shape of their alkaline salts dark powders soluble in water generally with a brownish coloration and dyeing cotton in brown shades, which are rendered very fast to washing by an after treatment with formaldehyde of fibers dyed with them, substantially as described.

5. The herein described new cotton dyestuffs of the following general formula:

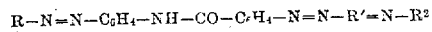

where R and R² are end components containing amino groups and R' the radical of a naphthalene sulfonic acid, which dyes are after being dried and pulverized in the shape of their alkaline salts dark powders soluble in water generally with a brownish coloration and dyeing cotton in brown shades, which are rendered very fast to washing by an after treatment with formaldehyde of fibers dyed with them, substantially as described.

6. The herein described new cotton dyestuff having in a free state most probably the formula:

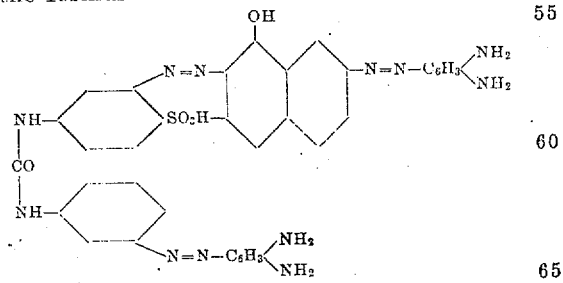

which is after being dried and pulverized in the shape of its sodium salt a dark powder soluble in water with a brown coloration and being soluble in concentrated sulfuric acid of 66° Bé. with a brown coloration; yielding upon reduction with stannous chlorid and hydrochloric acid carbonic acid, metaphenlylenediamin, triamino-benzene and 2.7-diamino-8-naphthol-6-sulfonic acid; and dyeing cotton in bright brown shades, which are rendered fast to washing by an after-treatment with formaldehyde, substantially as described.

In testimony whereof we have hereunto set our hands in the presence of two subscribing witnesses.

AUGUST BLANK. [L. S.]
CARL HEIDENREICH. [L. S.]
JOHANNES JANSEN. [L. S.]

Witnesses:
HELEN NUFER,
ALBERT NUFER.

---

Copies of this patent may be obtained for five cents each, by addressing the "Commissioner of Patents, Washington, D. C."

---

Corrections in Letters Patent No. 1,082,581.

It is hereby certified that in Letters Patent No. 1,082,581, granted December 30, 1913, upon the application of August Blank, Carl Heidenreich, and Johannes Jensen, of Leverkusen, near Cologne, Germany, for an improvement in "Cotton Dyestuffs," errors appear in the printed specification requiring correction as follows: Page 1, line 42, for the word "tetrazoized," read *tetrazotized;* same page, line 77, after the word "carbonic" insert the word *acid;* page 2, line 12, formula, for $$R-N=N-C_6H_4-NH-CO-NH=C_6H_4-N=N-R'-N=N-R^2,$$

read $$R-N=N-C_6H_4-NH-CO-NH-C_6H_4-N=N-R'-N=N-R^2,$$

and that the said Letters Patent should be read with these corrections therein that the same may conform to the record of the case in the Patent Office.

Signed and sealed this 3rd day of March, A. D., 1914.

[SEAL.]

J. T. NEWTON,
*Acting Commissioner of Patents.*

It is hereby certified that in Letters Patent No. 1,082,581, granted December 30, 1913, upon the application of August Blank, Carl Heidenreich, and Johannes Jensen, of Leverkusen, near Cologne, Germany, for an improvement in "Cotton Dyestuffs," errors appear in the printed specification requiring correction as follows: Page 1, line 42, for the word "tetrazoized," read *tetrazotized;* same page, line 77, after the word "carbonic" insert the word *acid;* page 2, line 12, formula, for $$R-N=N-C_6H_4-NH-CO-NH=C_6H_4-N=N-R'-N=N-R^2,$$

read $$R-N=N-C_6H_4-NH-CO-NH-C_6H_4-N=N-R'-N=N-R^2,$$

and that the said Letters Patent should be read with these corrections therein that the same may conform to the record of the case in the Patent Office.

Signed and sealed this 3rd day of March, A. D., 1914.

[SEAL.]

J. T. NEWTON,
*Acting Commissioner of Patents.*